(12) United States Patent
Takahashi et al.

(10) Patent No.: US 6,673,457 B2
(45) Date of Patent: Jan. 6, 2004

(54) RADIATION-CURABLE ORGANOPOLYSILOXANE COMPOSITION

(75) Inventors: Masatoshi Takahashi, Gunma-ken (JP); Masahiko Ogawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 62 days.

(21) Appl. No.: 10/012,421

(22) Filed: Dec. 12, 2001

(65) Prior Publication Data

US 2002/0106520 A1 Aug. 8, 2002

(30) Foreign Application Priority Data

Dec. 13, 2000 (JP) ........................................ 2000-378867

(51) Int. Cl.[7] .............................................. B32B 25/20
(52) U.S. Cl. .......................... 428/447; 427/387; 522/25; 522/27; 522/28; 522/29; 528/23; 528/25; 528/31; 528/33
(58) Field of Search ........................ 428/447; 427/387; 522/25, 27, 28, 29; 528/23, 25, 31, 33; 525/428

(56) References Cited

U.S. PATENT DOCUMENTS

| | | | |
|---|---|---|---|
| 4,617,238 A | 10/1986 | Crivello et al. | |
| 5,054,883 A | 10/1991 | Eckberg | |
| 5,059,512 A | * 10/1991 | Babich et al. | 430/280.1 |
| 5,139,816 A | 8/1992 | Eckberg | |
| 5,147,946 A | 9/1992 | Liu | |
| 5,521,227 A | * 5/1996 | Palazzotto et al. | 522/4 |
| 5,650,453 A | 7/1997 | Eckberg et al. | |
| 5,962,546 A | * 10/1999 | Everaerts et al. | 522/25 |
| 6,593,388 B2 | * 7/2003 | Crivello | 522/25 |

* cited by examiner

*Primary Examiner*—Robert Dawson
*Assistant Examiner*—Christopher M Keehan
(74) *Attorney, Agent, or Firm*—Millen, White, Zelano & Branigan, P.C.

(57) ABSTRACT

The invention discloses a novel radiation-curable silicone-based release coating composition capable of giving a cured release coating film on a substrate such as a plastic resin film exhibiting excellent adhesion to a variety of substrate materials and excellent releasability. The radiation-curable releasing silicone composition of the invention comprises (A) an aromatic compound having, in a molecule, at least two cationically polymerizable organopolysiloxanyl groups such as epoxy-substituted organopolysiloxanyl groups as the silicone ingredient and (B) a photopolymerization initiator which is an onium salt compound such as diaryliodonium salt compounds.

18 Claims, No Drawings

RADIATION-CURABLE ORGANOPOLYSILOXANE COMPOSITION

BACKGROUND OF THE INVENTION

The present invention relates to a novel organopolysiloxane composition curable by irradiation with actinic rays such as ultraviolet light, X-rays and electron beams to give a cured coating film of the composition on a substrate surface exhibiting good adhesion to the substrate material and excellent releasability so as to be useful as a release coating agent.

It is an established technology to employ a curable organopolysiloxane composition as a coating agent on a surface required to have surface releasability such as releasable sheets for temporary protection of the adhesive surface of a pressure-sensitive adhesive label, processing sheets for use in a molding process of plastic resins and back surface of a pressure-sensitive adhesive tape in a rolled form.

A curable organopolysiloxane composition widely employed for this purpose in the prior art is prepared by uniformly dissolving, in an organic solvent such as toluene, an alkenyl group-containing organopolysiloxane of a high degree of polymerization and an organohydrogenpolysiloxane together with a catalytic amount of a platinum compound as a catalyst for promoting the hydrosilation reaction or so-called addition reaction between the silicon-bonded alkenyl groups and the silicon-bonded hydrogen atoms forming a crosslinked structure. Although such a composition can readily be cured by a heating treatment to give a cured coating film having good adhesion to the surface of a substrate such as plastic films exhibiting excellent surface releasability and slipperiness, a serious problem accompanying use of the organopolysiloxane composition of this type is the environmental pollution caused by the solvent vapor emitted from the composition during processing.

A curable organopolysiloxane composition of this type but free from any organic solvents can of course be prepared if the alkenyl group-containing organopolysiloxane has a sufficiently low degree of polymerization. Such a curable organopolysiloxane composition, however, is practically disadvantageous because the cured coating film obtained therefrom is so fragile and exhibits no adhesion to the substrate surface on which the coating layer of the composition is cured.

Alternatively, a radiation-curable organopolysiloxane composition free from any organic solvents can be prepared by using an acrylate-modified organopolysiloxane. Although the curable organopolysiloxane composition of this type gives a cured coating film having good adhesion to the surface of plastic films, a disadvantage therein is that the curing treatment thereof requires use of an expensive radiation source such as special ultraviolet lamps and electron beam accelerators necessarily leading to an increase of the cost for the treatment. In addition, the irradiation treatment of the coating layer thereof must be performed in an atmosphere of an inert gas such as nitrogen resulting in a further increase of the cost for the curing treatment.

Further alternatively, there are known curable organopolysiloxane compositions comprising an epoxy-modified, vinyl ether-modified or oxetane-modified organopolysiloxane and a photopolymerization initiator which is typically an iodonium salt compound.

Epoxy compounds in general are known to have advantages of very little curing shrinkage by polymerization and excellent adhesion to the surface of a variety of substrates including metals and plastics so that epoxy resin-based coating compositions are widely employed for coating surfaces of a tinplate. When a curable composition comprising an epoxy-modified organopolysiloxane is used for the purpose of release coating, however, excellent releasability can hardly be obtained unless the epoxy equivalent of the composition is unduly decreased necessarily leading to a decrease in the mechanical strength of the cured coating film and adhesion of the cured coating film to the substrate material although this problem of a decrease in the adhesive bonding strength can at least partly be solved by undertaking a pretreatment of the substrate material with a primer composition assuming that an increase in the cost for the pretreatment can be disregarded.

SUMMARY OF THE INVENTION

The present invention accordingly has an object, in view of the above described problems and disadvantages in the prior art, to provide a novel and improved radiation-curable organopolysiloxane composition free from any organic solvents, which is curable by irradiation with ultraviolet light, electron beams or X-rays to give a cured coating film exhibiting good adhesion to the surface of a substrate such as plastic films and exhibiting excellent releasability against a variety of adhesive surfaces.

Thus, the radiation-curable organopolysiloxane composition provided by the present invention comprises, as a uniform mixture without any organic solvents;

(A) 100 parts by weight of an aromatic compound having, in a molecule, at least two cationically polymerizable organopolysiloxanyl groups; and (B) from 0.3 to 5 parts by weight of an onium salt compound as a photopolymerization initiator of the component (A).

In particular, the component (A) is a compound represented by the general formula $[X—Y]_n Z$, in which the subscript n is a positive integer of 2 or larger, X is an organopolysiloxanyl group having a cationically polymerizable group, Y is a divalent group linking X and Z and Z is an n valent organic residue having an aromatic ring. The group X is preferably an organopolysiloxanyl group represented by the average unit formula

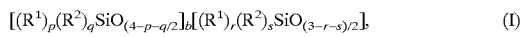

$$[(R^1)_p(R^2)_q SiO_{(4-p-q/2)}]_b[(R^1)_r(R^2)_s SiO_{(3-r-s)/2}] \qquad (I)$$

in which $R^1$ is a monovalent hydrocarbon group free from a cationically polymerizable group, $R^2$ is a monovalent hydrocarbon group substituted by a cationically polymerizable group, the subscript b is 0 or a positive number not exceeding 10000 and the subscripts p, q, r and s are each 0 or a positive integer not exceeding 3 with the proviso that p+q and r+s are each 0, 1, 2 or 3, all of p, q, r and s being not simultaneously equal to 0, and that, when b is not 0, r, s and r+s are each 0, 1 or 2. The above mentioned cationically polymerizable group is preferably an epoxy group, oxetanyl group or vinyloxy group.

DETAILED DESCRIPTION OF THE PREFERRED EMBODIMENTS

As is described above, the essential ingredients in the inventive radiation-curable organopolysiloxane composition are the components (A) and (B). The base ingredient of the composition is the component (A) which is an aromatic compound having at least two specific organopolyasiloxanyl groups in a molecule each containing a cationically polymerizable group to give a cured film of the composition by irradiation with actinic rays on the surface of a substrate exhibiting good adhesion thereto.

The component (A) is an aromatic compound having a general structure represented by the formula $[X—Y]_nZ$, in which X is an organopolysiloxanyl group having one or more of cationically polymerizable groups, Y is a divalent organic group linking X and Z and Z is an n-valent organic residue containing a monocyclic or polycyclic aromatic ring, the subscript n being a positive integer not smaller than 2. The group X is essential in order to effect radiation-induced curing of the composition and also to impart releasability to the cured film of the composition on a substrate surface.

The organopolysiloxanyl group denoted by X in the formula showing the general structure of the component (A) is represented by the average unit formula:

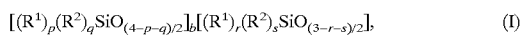

$$[(R^1)_p(R^2)_qSiO_{(4-p-q)/2}]_b[(R^1)_r(R^2)_sSiO_{(3-r-s)/2}]_n \quad (I)$$

in which each symbol has the meaning defined before.

The molecular structure of the organopolysiloxanyl group is not particularly limitative including straightly linear and branched structures optionally with a cyclic or partially cyclized structure.

The group denoted by $R^1$ in the above given formula (I) is, each independently from the others, an unsubstituted or substituted monovalent hydrocarbon group free from any cationically polymerizable groups as bonded to one of the silicon atoms. Examples of the group $R^1$ include straightly linear or branched alkyl groups such as methyl, ethyl, propyl and butyl groups, alkenyl groups such as vinyl and allyl groups and aryl groups such as phenyl and tolyl groups as well as those substituted groups obtained by replacing a part or all of the hydrogen atoms in the above named hydrocarbon groups with substituent atoms or groups, e.g., halogen atoms, such as chloromethyl, 3-chloropropyl and 3,3,3-trifluoropropyl groups, of which methyl group is preferable in respect of the easiness of the synthetic procedure of the compound and good surface releasability of the cured coating film of the composition. It is preferable that at least 85% or, practically, all of the groups $R^1$ are methyl groups. It is optional that a small fraction of the groups $R^1$ are hydrogen atoms, hydroxyl groups or alkoxy groups of 1 to 4 carbon atoms, e.g., methoxy, ethoxy and propoxy groups, directly bonded to the silicon atoms. As a possibility, these functional groups can be utilized for a reaction with other different functional groups to impart unique performance to the compound.

The group denoted by $R^2$ is, each independently from the others, a monovalent hydrocarbon group having a cationically polymerizable structure therein. Such a cationically polymerizable group is exemplified by epoxy-containing groups such as 3,4-epoxybutyl, 3-glycidyloxypropyl and 2-(3,4-epoxycyclohexyl)ethyl groups, oxycetanyl-containing groups such as 3-ethyl-3-oxycetanyl ethoxy and 3-(3-ethyl-3-oxycetanyl ethoxy)propyl groups, vinyloxy-containing groups such as 2-vinyloxyethyl, 3-vinyloxypropyl, 2-vinyloxyethoxy and 4-vinyloxybutoxy groups and those polymerizable groups having an internal olefinic group such as 2-butenyloxy and allenyloxy groups. Besides, the group $R^2$ can be a group derived from a compound containing a cyclic siloxane structure such as 2-(pentamethyl cyclotrisiloxanyl)ethyl and 2-(pentamethyl cyclotrisiloxanyl)ethoxy groups.

The subscripts p, q, r and s in the formula (I), which define the numbers of the groups $R^1$ and $R^2$ in one of the respective siloxane units, are each 0, 1, 2 or 3 with the proviso that p+q and r+s are each 0, 1, 2 or 3. It is essential that a substantial number of siloxane units in which p is 2 and q is 0 are included in the overall polysiloxane chains in order to accomplish compatibility of good surface releasability and good mechanical properties in the cured film of the composition. Introduction of the siloxane units where p is 2 and q is 0 is effective to give a branched chain structure leading to controllability of the viscosity and radiation-induced curability of the composition. The subscript b is 0 or a positive number not exceeding 10000 but b is preferably at least 5 or, more preferably, at least 10 in order to accomplish good surface releasability of the cured film of the composition. When the subscript b is not 0, r, s and r+s are each 0, 1 or 2.

The weight fraction of the siloxane units having the group $R^2$ in the overall siloxane units in the organopolysiloxanyl groups is preferably from 2 to 40% or, more preferably, from 5 to 25%. When the weight fraction of the $R^2$-containing siloxane units is too small, no good radiation-induced curability can be imparted to the composition while, when the weight fraction is too large, a decrease is caused in the releasability of the cured film of the composition along with an adverse influence on the pressure-sensitive adhesive surface, to which the releasable sheet prepared by using the composition is attached for temporary protection of the adhesive surface, due to remaining unreacted functional groups in the cured film of the composition.

The group denoted by Y is a linking unit between X and Z and exemplified by hetero atoms such as atoms of oxygen, nitrogen and sulfur, straight-chain or branched alkylene groups such as methylene, ethylene, propylene and dimethylmethylene groups, divalent hydrocarbon groups having a divalent hetero atom or imino group at the chain terminal or between two carbon atoms as represented by the general formulas —$R^3$—X'— or —X'—(—$R^3$—X')$_c$— and divalent hydrocarbon groups interrupted by a carbonyl group as represented by the general formula —$R^3$—X'—CO—$R^3$— as well as divalent hydrocarbon groups having an organosiloxane linkage as represented by the general formula —$R^3$—(—$SiR^4_2$—O—)$_d$—, in which $R^3$ is an alkylene group, $R^4$ is a hydrogen atom or a monovalent hydrocarbon group, X' is an atom of oxygen or sulfur or an imino group of the formula —$NR^4$— and the subscripts c and d are each a positive integer not exceeding 8.

Particular examples of the group Y include, though not particularly limitative thereto, those expressed by the following formulas of: —(CH$_2$)$_3$—; —(CH$_2$CH$_2$O)$_2$—; —(CH$_2$)$_3$—S—; —O—(CH$_2$CH$_2$O)$_3$—, —(CH$_2$)$_3$—O—CO— and —(CH$_2$)$_3$—Si(CH$_3$)$_2$—O—.

The group denoted by Z is an n-valent organic residue having a ring structure with aromaticity and bonded to the group or groups X each through the linking unit Y. The ring structure with aromaticity here implied includes divalent or higher aromatic groups such as phenylene, naphthylene, anthracenylene and phenanthrenylene groups and heterocyclic groups derived from a heterocyclic compound such as thiophene, pyridine and the like. The group Z may contain two or more aromatic ring structures in a molecule such as those derived from a bisphenol resin, phenol novolak resin and the like as connected together through a divalent hydrocarbon group and/or an organopolysiloxane group. The linking group between the aromatic ring structures can be a cationically polymerizable organopolysiloxane group or other functional groups although the cationically polymerizable group can be directly bonded. Particularly preferable among them are those involving bisphenol A or a phenol novolak resin in respect of obtainining good adhesion of the cured coating film of the composition to the substrate surface. Alternatively, those having two or more aromatic ring structures in a molecule as bonded together through an organopolysiloxane linkage are preferable in respect of excellent surface releasability of the cured coating film.

Particular examples of the group Z include those expressed by the following structural formulas, though not limited thereto:

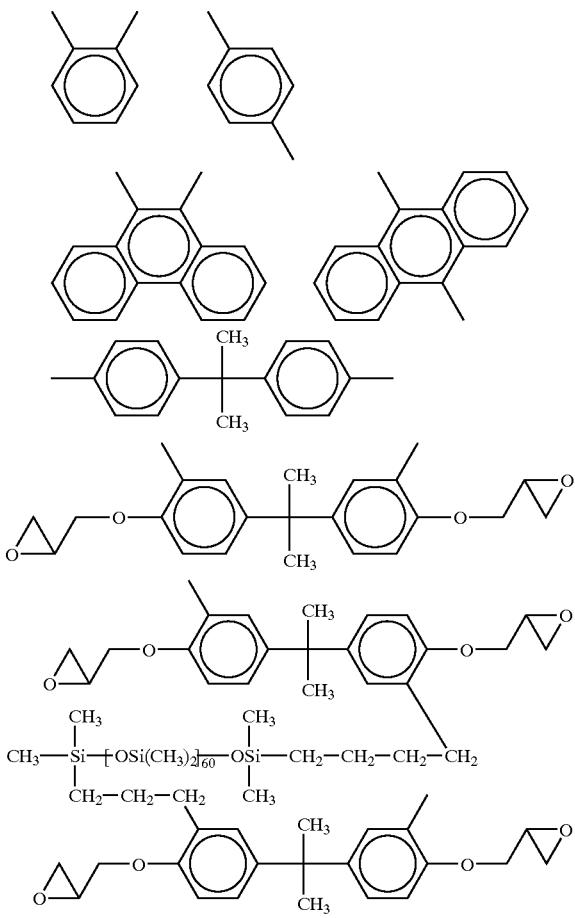

The aromatic compound having at least two cationically polymerizable organopolysiloxanyl groups in a molecule as the component (A) contains, as an average number per molecule, from 10 to 10000 silicon atoms or, preferably, from 10 to 500 silicon atoms. When the number of silicon atoms per molecule is too small, a cured coating film of the composition cannot be obtained by irradiation with a radiation while, when the number of silicon atoms is too large, a difficulty is encountered in coating of a substrate surface with the composition due to an excessively high viscosity of the composition. In consideration of the coating workability with the composition, it is preferable that the component (A) has a viscosity at 25° C. in the range from 20 to 500000 MPa·s or, more preferably, from 20 to 100000 MPa·s. When the viscosity of the component (A) is too low, crawling is sometimes caused in the coating layer of the composition while, when the viscosity is too high, uniform coating with the composition can hardly be accomplished by using a conventional coating machine.

The component (B) comprised in the inventive radiation-curable composition is an onium salt compound which serves as a photopolymerization initiator of the cationically polymerizable groups in the component (A). The onium salt compound is preferably a compound represented by the general formula:

$(R^5)_x M^+ \cdot G^-$, in which $R^5$ is, each independently from the others, a monovalent group selected from monocyclic aromatic groups and heterocyclic groups with aromaticity, $M^+$ is a monovalent cation of the element selected from iodine, sulfur, selenium and phosphorus, $G^-$ is a monovalent non-basic and non-nucleophilic anion selected from $BF_4^-$, $PF_6^-$, $AsF_6^-$, $SbF_6^-$, $ClO_4^-$, $HSO_4^-$ and $B(C_6F_5)_4^-$ and the subscript x is 2 when M is iodine, 3 when M is sulfur or selenium or 4 when M is phosphorus.

The monocyclic aromatic group as a class of the group $R^5$ contained in the onium salt compound as the component (B) is exemplified by aryl groups such as phenyl and naphthyl groups and substituted aryl groups by replacing one or more of the hydrogen atoms in the unsubstituted aryl groups with substituent atoms and/or groups selected from alkyl groups such as methyl, ethyl, propyl, butyl, octyl, decyl and dodecyl groups, alkoxy groups such as methoxy, ethoxy and propoxy groups, halogen atoms such as chlorine and bromine atoms and sulfur-containing groups such as mercapto and phenylmercapto groups. When good miscibility of the component (B) with the component (A) is desired, the group denoted by $R^5$ is preferably an aryl group substituted by an alkyl group of 8 to 20 carbon atoms or an alkoxy group of 1 to 10 carbon atoms. The element denoted by M is preferably iodine or sulfur in respect of the high activity in photopolymerization initiation. The counteranion $G^-$ is preferably selected from $PF_6^-$, $AsF_6^-$, $SbF_6^-$ and $B(C_6F_5)_4^-$.

The amount of the component (B) compounded in the inventive radiation-curable composition is in the range, for example, from 0.3 to 5 parts by weight per 100 parts by weight of the component (A) in consideration of the balance between the curing behavior of the composition and economical merit though not particularly limitative to this range.

It is optional but desirable that the inventive radiation-curable composition comprising the above described essential components (A) and (B) is further compounded with a sensitizer as the component (C). Examples of the sensitizing compound include 2-ethyl-9,10-dimethoxyanthracene, 2-ethyl-9,10-diethoxyanthracene, 2-ethyl-9,10-methoxyethoxyanthracene, 2-ethyl-9,10-dibutoxyanthracene and 9,10-dimethoxyphenanthrene when the onium salt compound is an iodonium salt compound. It is preferable that two kinds or more of these compounds are used in combination as the component (C). The amount of the component (C) compounded in the inventive composition is, when used, in the range from 0.1 to 1.0 part by weight or, preferably, from 0.1 to 0.5 part by weight per 100 parts by weight of the component (A) by taking into consideration the limited miscibility of the compound and increase of the cost due to expensiveness of the compound.

It has further been discovered that the adhesive bonding of the cured coating film of the inventive composition to the substrate surface can further be improved by compounding the component (A) in combination with a cationically polymerizable organopolysiloxane compound having no aromatic ring structure within the molecule. The amount of this additional organopolysiloxane compound is not limitative depending on the desired adhesive bonding strength of the cured coating film to the respective substrate surfaces provided that the releasability of the cured film is not unduly decreased thereby.

It is further optional according to need that the inventive radiation-curable composition is admixed with a variety of known additives conventionally added to silicone-based release compositions including epoxy-based diluents, vinyl ether-based diluents, adhesion improvers to the substrate surface, levelling agents, antistatic agents, defoaming agents, coloring agents, i.e. pigments and dyes, and organopolysiloxanes of other types each in a limited amount. A small volume of an organic solvent can also be added to the composition if the problem of environmental pollution by the solvent vapor emission can be disregarded.

The radiation-curable composition of the present invention described above can readily be cured on a substrate material by irradiation of a coating layer of the composition with ultraviolet light in a relatively small dose to give a cured coating film of the composition exhibiting excellent releasability against pressure-sensitive adhesives so that the inventive composition is useful for the back-surface release treatment of a pressure-sensitive adhesive tape in a roll and for the preparation of releasable sheets for temporary protection of adhesive surfaces of, e.g., labels. Such a releasable anti-adhesion protective sheet can be prepared by coating the surface of a substrate such as a paper sheet with the inventive composition to form a coating layer followed by irradiation of the coating layer with ultraviolet light.

Examples of the substrate sheet used in the preparation of the above mentioned releasable anti-adhesion protective sheet include cellulosic paper-based sheets such as glassine paper, clay-coated paper and kraft paper, plastic film laminates such as polyethylene/paper laminates, films of a synthetic resin such as polyester, polyethylene, polypropylene, polysyrene, polyvinyl chloride, polyimide and polytetrafluoroethylene and metal foils such as aluminum foils, of which the inventive composition is particularly useful for the surface-release treatment of films or sheets of plastic resins having a polar group or aromatic group in the molecule such as polyester, polystyrene and polyimide resins. In addition to the applications for the back-surface treatment of rolled pressure-sensitive adhesive tapes and for the preparation of releasable anti-adhesion protective sheets, the inventive radiation-curable organopolysiloxane-based composition is useful also for the preparation of process sheets used in molding of synthetic resins.

The method for coating a substrate film or sheet with the inventive radiation-curable composition is not particularly limitative and can be conventional including the methods of roller coating, gravure coating, air-knife coating, wire doctor coating and dip coating. The coating amount of the inventive composition on the substrate material is usually in the range from 0.1 to 20 g/m$^2$ and, when the coating layer of the composition is irradiated with a radiation such as ultraviolet light, X-rays and electron beams, the coating layer can readily be cured with a small irradiation dose to give a cured film of the composition on the substrate surface. Other radiation sources applicable to curing of the inventive composition include lasers such as semiconductor lasers, argon lasers and He—Cd lasers and ionizing radiations such as α-rays, β-rays, γ-rays, neutron beams, X-rays and accelerated electron beams. When the radiation to cure the inventive composition is ultraviolet light, a variety of ultraviolet lamps can be used therefor including low-, medium-, high- and ultrahigh-pressure mercury lamps, metal halide lamps, xenon lamps, and carbon arc lamps. When a high-pressure mercury lamp of 80 watts/cm output is employed as the radiation source for curing the inventive composition, the coating film of the composition on a substrate surface can be cured usually by the irradiation for 0.01 to 10 seconds at a distance of 5 to 20 cm.

In the following, the present invention is described in more detail by way of Examples as preceded by the description of the Synthesis Examples for the preparation of the organopolysiloxane-based compounds as the component (A) although these Examples never limit the scope of the invention in any way. In the following description, the term of "parts" always refers to "parts by weight" and the values of viscosity were each obtained by the measurement at 25° C.

Synthesis Example 1

Into a four-necked flask equipped with a stirrer, thermometer, reflux condenser and dropping funnel were introduced 50.0 parts of toluene, 0.47 part of acetonitrile and 160 parts of an organohydrogenpolysiloxane expressed by the average formula of Me$_3$Si—O—(—SiHMe—O—)$_3$—(—SiMe$_2$—O—)$_{25}$—SiMe$_3$, in which Me is a methyl group, to form a reaction mixture and the flask was flushed with nitrogen gas.

After addition of 0.45 part of a 0.5% toluene solution of a platinum catalyst (CAT-PL-56, a product by Shin-Etsu Chemical Co.), the reaction mixture was heated up to a temperature of 60° C. and a mixture of 9.5 parts of diallyl phthalate, 20.0 parts of 4-vinylcyclohexene oxide and 0.88 part of isopropyl alcohol was added thereto dropwise over a period of 30 minutes during which the temperature of the reaction mixture was increased to 70° C. After completion of the dropwise addition of the mixture, agitation of the reaction mixture was further continued for additional 6 hours at a temperature of 60° C. and then 0.03 part of triphenylphosphine was added thereto to terminate the reaction followed by stripping of toluene and other volatile matters by distillation at 80° C. under a pressure of 5 Torr. The thus obtained product, referred to as the Product 1 hereinafter, was a light brown, clear liquid having a viscosity of 178 MPa·s and an epoxy equivalent of 1800.

Synthesis Example 2

The experimental procedure was substantially the same as in Synthesis Example 1 excepting for the replacement of the diallyl phthalate with the same amount of diallyl terephthalate to obtain a reaction product, referred to as the Product 2 hereinafter, which was a light brown, cloudy liquid having a viscosity of 637 MPa·s and an epoxy equivalent of 1880.

Synthesis Example 3

Into the same four-necked flask as used in Synthesis Example 1 were introduced 62.1 parts of bisphenol A and 60.8 parts of dioxane to form a reaction mixture and, after flushing of the flask with nitrogen gas, a mixture of 36.1 parts of vinyl dimethyl chlorosilane and 110 parts of divinyl tetramethyl disilazane was added thereto dropwise at room temperature over a period of 1.5 hours, during which period the temperature of the reaction mixture was increased up to 80° C. where agitation of the reaction mixture was continued for additional 5 hours to find appearance of white precipitates in the reaction mixture. After cooling of the reaction mixture down to room temperature, 160 parts of toluene were added to the reaction mixture and the organic solution was washed twice with 100 parts of water and then dried over anhydrous sodium sulfate. After filtration, the thus dried reaction mixture was subjected to stripping of toluene, dioxane and other volatile matters by distillation at 100° C. under a pressure of 5 Torr to obtain 103 parts of an intermediate product, referred to as the Intermediate 1 hereinafter, which was a light yellow, clear liquid having a viscosity of 27 MPa·s and a vinyl equivalent of 0.466 mole/100 g. The results of the $^1$H-NMR analysis of the Intermediate 1 in CDCl$_3$ were as shown below.

$^1$H-NMR, CDCl$_3$, δ, ppm: 0.34 (12H); 1.63 (6H); 5.83–6.32 (6H); 6.73–6.77 (4H); 7.06–7.11 (4H).

Synthesis Example 4

The same four-necked flask as used in Synthesis Example 1 was charged with 50.0 parts of toluene, 0.46 part of acetonitrile and 164 parts of a methylhydrogenpolysiloxane expressed by the average formula $Me_3SiO—(—SiHMe—O—)_3—(—SiMe_2—O—)_2—SiMe_3$, in which Me is a methyl group, to form a reaction mixture and the flask was flushed with nitrogen gas.

Thereafter, 0.44 part of a 0.5% toluene solution of the platinum catalyst (supra) was added to the reaction mixture which was heated up to a temperature of 60° C. where the reaction mixture was admixed dropwise with a mixture of 14.7 parts of the Intermediate 1 obtained in Synthesis Example 3, 19.5 parts of 4-vinylcyclohexene oxide and 1.02 parts of isopropyl alcohol over a period of 1.5 hours during which the temperature of the reaction mixture was gradually increased to 65° C. After completion of the dropwise addition of the mixture, the reaction mixture in the flask was continuously agitated for further 6 hours at 65° C. and then admixed with 0.03 part of triphenyl phosphine to terminate the reaction followed by stripping of toluene and other volatile matters at 80° C. under a pressure of 5 Torr to obtain a light brown, cloudy liquid as the product, referred to as the Product 3 hereinafter, having a viscosity of 276 MPa·s and an epoxy equivalent of 1630.

Synthesis Example 5

The same four-necked flask as used in Synthesis Example 1 was charged with 10.0 parts of toluene, 0.45 part of acetonitrile and 161 parts of the same methylhydrogenpolysiloxane as used in Synthesis Example 4 above to form a reaction mixture and the flask was flushed with nitrogen gas.

Thereafter, 0.43 part of a 0.5% toluene solution of the same platinum catalyst (supra) was added to the reaction mixture which was heated up to a temperature of 55° C. where the reaction mixture was admixed dropwise with a mixture of 18.63 parts of diallyl diglycidyl ether bisphenol A (RE-810NM, a product by Nippon Kayaku Co.), 19.1 parts of 4-vinylcyclohexene oxide and 0.57 part of isopropyl alcohol over a period of 1 hour. After completion of the dropwise addition of the mixture, the reaction mixture in the flask was continuously agitated for further 1 hour at 70° C. and then admixed with 0.03 part of triphenyl phosphine to terminate the reaction followed by stripping of toluene and other volatile matters at 80° C. under a pressure of 5 Torr and removal of the microgels formed in the mixture by filtration to obtain 185 parts of a light brown, clear liquid as the product, referred to as the Product 4 hereinafter, having a viscosity of 923 MPa·s and an epoxy equivalent of 1022.

Synthesis Example 6

The same four-necked flask as used in Synthesis Example 1 was charged with 10.0 parts of toluene, 0.46 part of acetonitrile, 8.20 parts of the same methylhydrogen polysiloxane as used in Synthesis Example 4 and 18.81 parts of the same diallyl diglycidyl ether bisphenol A as used in Synthesis Example 5 above to form a reaction mixture and the flask was flushed with nitrogen gas.

Thereafter, 0.43 part of the 0.5% toluene solution of the same platinum catalyst (supra) was added to the reaction mixture which was heated up to a temperature of 65° C. where the reaction mixture was agitated for 30 minutes followed by cooling down to room temperature. The reaction mixture in the flask was admixed with 18.3 parts of 4-vinylcyclohexene oxide and 0.25 part of isopropyl alcohol.

Separately, the same four-necked flask as used in Synthesis Example 1 was charged with 154 parts of the same methylhydrogenpolysiloxane as used above and the flask was flushed with nitrogen gas. After a temperature increase of this portion of the methylhydrogenpolysiloxane up to 60° C., the reaction mixture prepared above was added dropwise to this portion of the methylhydrogenpolysiloxane over a period of 1 hour followed by further continued agitation for additional 1 hour at 60° C. Thereafter, the reaction mixture in the flask was admixed with 0.03 part of triphenyl phosphine to terminate the reaction followed by stripping of toluene and other volatile matters at 80° C. under a pressure of 5 Torr to obtain 180 parts of a light brown, clear liquid as the product, referred to as the Product 5 hereinafter, having a viscosity of 926 MPa·s and an epoxy equivalent of 1084.

Synthesis Example 7

The same four-necked flask as used in Synthesis Example 1 was charged with 10.0 parts of toluene, 0.46 part of acetonitrile, 16.4 parts of a methylhydrogenpolysiloxane expressed by the average formula $HMe_2Si—O—(—SiMe_2—O—)_{58}—SiMe_2H$, in which Me is a methyl group, and 18.81 parts of diallyl diglycidyl ether bisphenol A to form a reaction mixture and the flask was flushed with nitrogen gas. Thereafter, 0.43 part of the 0.5% toluene solution of the same platinum catalyst as used in the preceding Synthesis Examples was added to the reaction mixture which was heated up to a temperature of 65° C. and agitated for 30 minutes at this temperature followed by cooling down to room temperature and admixture of 17.4 parts of 4-vinylcyclohexene oxide and 0.52 part of isopropyl alcohol.

Separately, the same four-necked flask as used in Synthesis Example 1 was charged with 146 parts of the same methylhydrogenpolysiloxane as used in Synthesis Example 3 and the flask was flushed with nitrogen gas. After a temperature increase up to 60° C. under agitation, this second methylhydrogenpolysiloxane was admixed dropwise with the above prepared reaction mixture over a period of 1 hour followed by further continued agitation for additional 1 hour at the same temperature and addition of 0.03 part of triphenylphosphine to terminate the reaction. The reaction mixture was then subjected to stripping of toluene and other volatile matters at 80° C. under a pressure of 5 Torr followed by filtration to remove the microgels formed therein to give 180 parts of a light brown, clear liquid, referred to as the Product 6 hereinafter, having a viscosity of 60 MPa·s and an epoxy equivalent of 1075.

EXAMPLE 1

A surface-releasable composition, referred to as the Composition 1 hereinafter, was prepared by admixing 100 parts of the Product 1 prepared in Synthesis Example 1 with 1 part of an iodonium salt compound expressed by the general formula $R^6—C_6H_4—I^+.SbF_6^-$, in which $R^6$ represents a combination of unidentified straightly linear and/or branched alkyl groups having 10 to 14 carbon atoms, which could be uniformly dissolved in the Product 1 to give a clear liquid as the Composition 1.

A continuous-length film of a polyethylene terephthalate resin as the base film was uniformly coated with the above prepared Composition 1 on a transfer printing machine in a coating amount of 0.7 g/m² and the coated film was transferred at a line velocity of 30 meters/minute below a pair of high-pressure mercury lamps of 80 watts/cm linear output positioned 13 cm above the running film so that the Composition 1 of the coating layer was irradiated with ultraviolet light in an irradiation dose of 70 mJ/cm² and cured into a cured coating film which was subjected to evaluation for the following testing items by the testing procedures respectively described there.

(1) Adhesion of coating film to the base film: The cured coating film, either as just cured or after aging for 30 days at room temperature, was gently rubbed 10 times with the flat of an index finger and the rubbed surface was painted with a red marking ink using a marker pen to improve visibility of the surface condition. The results of this visual inspection were rated in five ratings of 5 to 1 according to the following criteria. Table 1 below shows the results for the coating film just as cured and after aging at room temperature for 30 days.

5: marking ink repelled on allover the surface
4: slight adherence of marking ink to the rubbed areas
3: substantial adherence of marking ink to the rubbed areas
2: full adherence of marking ink to the rubbed areas or partial falling of the cured coating film
1: falling of the cured coating film (2) Peeling resistance: A 38 μm thick polyethylene terephthalate film provided with a cured coating film of the Composition 1 was subjected to aging at 25° C. for 20 hours and then coated with an acrylic resin-based emulsion-type pressure-sensitive adhesive (Oribine BPW-3110H, a product by Toyo Ink Co.) followed by a heat treatment at 100° C. for 3 minutes. A sheet of woodfree paper having a basis weight of 64 g/m² was applied and bonded to the thus adhesive-coated surface followed by standing at 25° C. for 3 minutes and the thus laminated sheet was cut into strips of 50 mm width. By using a tensile testing machine, the paper sheet was peeled off the adhesive-coated base film at a pulling velocity of 30 cm/minute in a pulling angle of 180 degrees to determine the force in N/50 mm required for peeling, which was recorded as the peeling resistance. The result of this test is shown in Table 1 below.

(3) Adhesiveness retention: A 38 μm thick polyethylene terephthalate film provided with a cured coating film of the Composition 1 in the above described manner was subjected to aging at 25° C. for 20 hours and then a pressure-sensitive adhesive tape (Nitto No. 31B Tape, a product by Nitto Denko Co.) was applied and bonded to the surface of the cured coating film followed by a heat treatment at 70° C. for 20 hours under a load of 20 g/cm². After cooling to room temperature, the adhesive tape was taken by peeling and again applied and bonded to a well polished surface of a stainless steel plate and the peeling resistance of the adhesive tape from the stainless steel plate was determined and recorded as $F^1$ in the unit of N/25 mm. Separately, a fresh piece of the same pressure-sensitive adhesive tape was applied and bonded to a clean surface of a polytetrafluoroethylene resin (Teflon) plate and, after a heat treatment at 70° C. for 20 hours under a load of 20 g/cm², this second piece of the adhesive tape was taken by peeling off the Teflon plate and again applied and bonded to the stainless steel plate from which the adhesive tape was peeled off to determine the peeling resistance which was recorded as $F^2$ in the unit of N/25 mm. The adhesiveness retention (%) was given by $(F^1/F^2) \times 100$. The result of this test is shown in Table 1 below.

EXAMPLES 2 TO 6

The same testing procedures as described above were undertaken in each of these Examples excepting for the replacement of the Product 1 used in Example 1 with the same amount of Product 2, 3, 4, 5 or 6, respectively, prepared in Synthesis Examples. The results of the evaluation tests are shown in Table 1 below.

Comparative Example 1

The same procedure for the test of the adhesion of the coating film to the base surface was undertaken as in Example 1 excepting for the replacement of the Composition 1 used in Example 1 with an epoxy-modified organopolysiloxane having a viscosity of 150 MPa·s and an epoxy equivalent of 1200 as expressed by the average unit formula of $(Me_3SiO_{1/2})_{0.067}(EpMeSiO)_{0.099}$—$(Me_2SiO)_{0.833}$—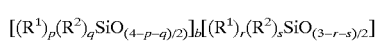$(MeSiO_{3/2})_{0.001}$, in which Me is a methyl group and Ep is a 2-(3,4-epoxycyclohexyl)ethyl group, admixed with 1% by weight of the same iodonium salt compound as used in the Composition 1. The results of the evaluation test for adhesion to the base surface are shown in Table 1.

Comparative Example 2

The same procedure for the test of the adhesion of the cured coating film to the base surface was undertaken as in Example 1 except that the surface-releasing composition was a commercially available product (KMS-320A, a product by Shin-Etsu Chemical Co.), which was a solventlesse composition curable by the mechanism of hydrosilation reaction, with admixture of 2% by weight of the same platinum catalyst as used above and curing of the coating film was effected by heating in a hot-air oven at 140° C. for 30 seconds. The results of the evaluation test for adhesion to the base surface are shown in Table 1.

TABLE 1

|  | Adhesion to substrate | | Peeling resistance, | Adhesiveness |
|---|---|---|---|---|
|  | as cured | after aging | N/50 mm | retention, % |
| Example 1 | 4 | 4 | 0.41 | 102 |
| Example 2 | 4 | 4 | 0.44 | 105 |
| Example 3 | 5 | 5 | 0.39 | 104 |
| Example 4 | 5 | 5 | 0.37 | 109 |
| Example 5 | 5 | 5 | 0.29 | 108 |
| Example 6 | 5 | 5 | 0.26 | 105 |
| Comparative Example 1 | 1 | 1 | — | — |
| Comparative Example 2 | 1 | 1 | — | — |

What is claimed is:

1. A radiation-curable organopolysiloxane composition which comprises, as a uniform blend:

(A) 100 parts by weight of an aromatic compound of the formula $[X\text{—}Y]_n Z$, in which the subscript n is a positive integer of 2 or larger, X is an organopolysiloxanyl group having at least one cationically polymerizable group, Y is a linking unit between X and Z and Z is an organic group having a divalent or higher aromatic ring and bonded to the linking unit Y at two or more sites; and (B) from 0.3 to 5 parts by weight of an onium salt compound as a photopolymerization initiator of the component (A).

2. The radiation-curable organopolysiloxane composition as claimed in claim 1 in which the organopolysiloxanyl group denoted by X is represented by the average unit formula:

$$[(R^1)_p(R^2)_q SiO_{(4-p-q)/2}]_b[(R^1)_r(R^2)_s SiO_{(3-r-s)/2}]$$

in which $R^1$ is, each independently from the others, a monovalent hydrocarbon group free from a cationically polymerizable group, $R^2$ is, each independently from the others, a monovalent hydrocarbon group substituted by a cationically polymerizable group, the subscript b is 0 or a positive number not exceeding 10000 and the subscripts p, q, r and s are each 0, 1, 2 or 3 with the proviso that p+q is 0, 1, 2 or 3, r+s is 0, 1, 2 or 3, p+q+r+s is not equal to 0 and, when the subscript b is 1 or larger, the subscripts r and s are each 0, 1 or 2, r+s being 0, 1 or 2.

3. The radiation-curable organopolysiloxane composition as claimed in claim 1 in which the cationically polymerizable group is selected from the group consisting of epoxy group, oxetanyl group and vinyloxy group.

4. The radiation-curable organopolysiloxane composition as claimed in claim 1 in which the component (B) is a diaryliodonium salt compound or a triarylsulfonium salt compound.

5. The radiation-curable organopolysiloxane composition as claimed in claim 1 which further comprises (C) a photosensitizing agent in an amount of 0.1 to 1.0 part by weight per 100 parts by weight of the component (A).

6. The radiation-curable organopolysiloxane composition as claimed in claim 5 in which the component (C) is selected from the group consisting of 9,10-dialkoxyanthracene compounds, naphthalene compounds, phenanthrene compounds, thioxanthone compounds and carbazole compounds.

7. A release coating film formed on the surface of a substrate by irradiating a coating layer of the radiation-curable organopolysiloxane composition defined in claim 1 with a radiation.

8. A method for the formation of a release coating film on the surface of a substrate which comprises the steps of:

(1) coating the substrate surface with the radiation-curable organopolysiloxane composition defined in claim 1 to form a coating layer; and (2) irradiating the coating layer with a radiation to effect curing of the radiation-curable composition.

9. The method as claimed in claim 8 in which the radiation is ultraviolet light.

10. The composition of claim 2, wherein in the formula for X, $R^1$ are, each independently of one another, linear or branched alkyl, alkenyl, phenyl or tolyl, each optionally substituted by halogen atoms, and $R^2$ are, each independently of one another, an epoxy-containing group, an oxycetanyl-containing group, a vinyloxy-containing group, a group containing an internal 2-butenyloxy or allenyloxy olefinic group or a group containing a cyclic siloxane structure.

11. The composition of claim 2, wherein in the formula for X, at least 85% of the groups are methyl.

12. The composition of claim 2, wherein in the formula for X, there is at least one unit wherein b is a positive number, p is 2 and q is 0.

13. The composition of claim 12, wherein b is 5 or more.

14. The composition of claim 2, wherein the weight fraction of siloxane units having a group $R^2$ in the overall siloxane units for the organopolysiloxanyl group, X, is from 2 to 40%.

15. The composition of claim 2, wherein the weight fraction of siloxane units having a group $R^2$ in the overall siloxane units for the organopolysiloxanyl group, X, is from 5 to 25%.

16. The composition of claim 1, wherein the linking unit, Y, is an oxygen, nitrogen or sulfur atom, a straight or branched chain alkylene group, a divalent hydrocarbon group interrupted by a divalent hetero atom, imino group, carbonyl group or organosiloxane linkage.

17. The composition of claim 1, wherein Z is a phenylene, naphthylene, anthracenylene, phenanthenylene, thiophene or pyridine group or a group containing two or more such aromatic rings connected through a divalent, hydrocarbon group and/or an organopolysiloxane group.

18. The composition of claim 1, wherein the aromatic compound (A) has an average number per molecule of 10 to 1000 silicon atoms.

* * * * *